(12) United States Patent
Kesselgruber

(10) Patent No.: US 7,392,116 B2
(45) Date of Patent: Jun. 24, 2008

(54) METHOD FOR OPERATING A CHASSIS REGULATING SYSTEM AND A DEVICE TO CARRY OUT THE METHOD

(75) Inventor: Dirk Kesselgruber, Cologne (DE)

(73) Assignee: TRW Automotive GmbH (DE)

( * ) Notice: Subject to any disclaimer, the term of this patent is extended or adjusted under 35 U.S.C. 154(b) by 758 days.

(21) Appl. No.: 10/924,335

(22) Filed: Aug. 23, 2004

(65) Prior Publication Data
US 2005/0055148 A1    Mar. 10, 2005

(30) Foreign Application Priority Data
Aug. 25, 2003    (DE) .................. 103 38 994

(51) Int. Cl.
*G05D 1/00* (2006.01)
(52) U.S. Cl. ................. 701/1; 701/41; 701/72; 701/79; 701/110; 180/252
(58) Field of Classification Search ............ 701/1, 701/41, 70, 72, 79, 95, 110; 180/197, 204, 180/252
See application file for complete search history.

(56) References Cited

U.S. PATENT DOCUMENTS

| | | | |
|---|---|---|---|
| 4,679,808 A | 7/1987 | Ito et al. | |
| 5,060,969 A | 10/1991 | Kamimura et al. | |
| 5,144,558 A | 9/1992 | Fukushima et al. | |
| 5,384,705 A | 1/1995 | Inagaki et al. | |
| 2001/0021885 A1 | 9/2001 | Schulke et al. | |

FOREIGN PATENT DOCUMENTS

| | | |
|---|---|---|
| DE | 36 08 420 | 9/1986 |
| DE | 40 01 198 | 8/1990 |
| DE | 39 38 039 | 5/1991 |
| DE | 37 88 594 | 5/1994 |
| DE | 692 11 362 | 11/1996 |
| DE | 199 58 492 | 6/2001 |
| DE | 101 40 604 | 4/2003 |
| EP | 0 933 239 | 8/1999 |

OTHER PUBLICATIONS

Document Bibliography and Abstract for DE 36 08 420 from http://v3.espacenet.com/textdoc?DB=EPODOC&IDX=DE3608420&F=0, printed Nov. 11, 2004.
Document Bibliography and Abstract for DE 40 01 198 from http://v3.espacenet.com/textdoc?DB=EPODOC&IDX=DE4001198&F=0, printed Nov. 11, 2004.
Document Bibliography and Abstract for DE 199 58 492 from http://v3.espacenet.com/textdoc?DB=EPODOC&IDX=DE19958492&F=0, printed Nov. 11, 2004.

*Primary Examiner*—Gertrude Arthur Jeangla
(74) *Attorney, Agent, or Firm*—MacMillan, Sobanski & Todd, LLC

(57) ABSTRACT

A method for operating a chassis regulating system of a vehicle, in which a control quantity is generated for an actuator, includes providing a first signal, which is representative of the transverse acceleration of the vehicle, providing a second signal, which is representative of the steering lock angle, providing a third signal, which is representative of the speed of the vehicle, allocating a weighting factor for the amplitude of the first signal, generating an estimated transverse acceleration signal from the second signal and the third signal, generating a weighted estimation signal by multiplying the estimated transverse acceleration signal with the weighting factor, and generating the control quantity by additive superimposing of the weighted estimation signal with the first signal.

16 Claims, 1 Drawing Sheet

METHOD FOR OPERATING A CHASSIS REGULATING SYSTEM AND A DEVICE TO CARRY OUT THE METHOD

CROSS REFERENCE TO RELATED APPLICATION

This application claims priority to German Application No. 103 38 994.6 filed Aug. 25, 2003, the disclosures of which are incorporated herein by reference.

The invention relates to a method for operating a chassis regulating system of a vehicle, in which a control quantity is generated for an actuator. The invention further relates to a device to carry out such a method.

BACKGROUND OF THE INVENTION

Conventional methods for operating a vertical dynamic chassis regulating system often use a sensor signal, which is representative of the transverse acceleration of the vehicle, as input quantity for calculating particular control quantities for hydraulic and/or electromechanical actuators, which are used for stabilizing the chassis. The hydraulic or electrical output of the actuators is designed with respect to highly dynamic driving states, which can occur temporarily in difficult driving situations. Particularly high requirements are set for the response behaviour of the actuators. In the quasi-stationary driving state, on the other hand, disturbances to the control signal, such as background noise or superimposed oscillations of the attachment parts of the transverse acceleration sensor, have a negative influence on the comfort of the system (e.g. noise development or perceptible high frequency oscillations). If the disturbed signal is subjected to a filtering process, delays occur in the signal pattern, which in turn have a negative effect on the dynamics of the system as a whole.

Thus, there is a desire to provide a method for operating a chassis regulating system, which makes possible a better response behaviour of the actuators.

SUMMARY OF THE INVENTION

The method for operating a chassis regulating system of a vehicle, in which a control quantity is generated for an actuator, according to the invention comprises the following steps:
  providing a first signal, which is representative of the transverse acceleration of the vehicle,
  providing a second signal, which is representative of the steering lock angle,
  providing a third signal, which is representative of the speed of the vehicle,
  allocating a weighting factor for the amplitude of the first signal,
  generating an estimated transverse acceleration signal from the second signal and the third signal,
  generating a weighted estimation signal by multiplying the estimated transverse acceleration signal with the weighting factor, and
  generating the control quantity by additive superimposing of the weighted estimation signal with the first signal.

Through the addition of the weighted estimation signal to the first signal (transverse acceleration signal), in case of a jump in the steering angle a control quantity is obtained which with is increased relative to the transverse acceleration signal in the rising region. Thereby, the rising time of the signal is reduced, so that a faster controlling of the actuators can take place. The method according to the invention is optimized with regard to storage and computing time, because the improvement to the response behaviour is realized by the signal increase in a simple but effective manner.

It proves to be particularly advantageous to low-pass filter the first signal before the allocation of the weighting factor and before the additive superimposing with the weighted estimation signal. Thus, the conflict of aims described in the introduction between a rapid response behaviour of the actuators and an interference-free signal pattern of the control quantity can be solved.

Preferably, the allocation of the weighting factor is carried out according to a given function or table. The function or table can be tailored to the respective vehicle type and the corresponding requirements, without changes being necessary in the hardware of the chassis regulating system.

The invention also provides a device to carry out the method according to the invention. The device according to the invention comprises an arrangement for the allocation of the weighting factor, a transverse acceleration estimation arrangement to generate the estimated transverse acceleration signal, an arrangement for multiplication of the estimated transverse acceleration signal with the weighting factor and an arrangement for the additive superimposing of the weighted estimation signal with the first signal.

Other advantages of this invention will become apparent to those skilled in the art from the following detailed description of the preferred embodiment, when read in light of the accompanying drawings.

DETAILED DESCRIPTION OF THE INVENTION

Figure 1:
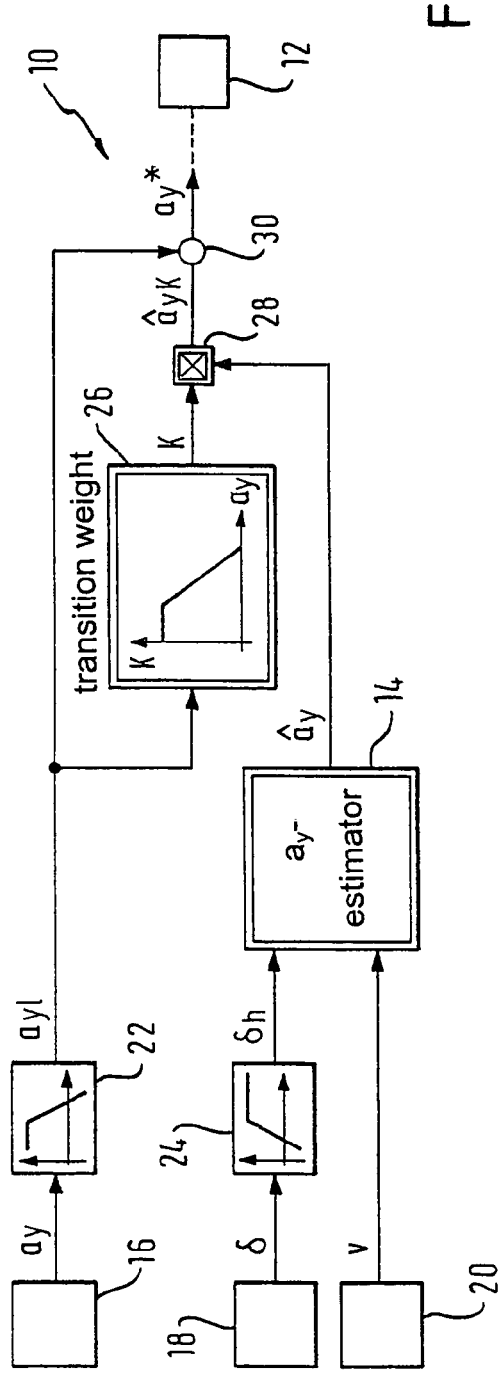
FIG. 1 shows a block diagram of the method according to the invention.

In FIG. 1 a block diagram is shown to illustrate the method according to the invention, with which a control quantity $a_y^*$ is generated. The control quantity $a_y^*$ is used to control and regulate an actuator 12 of the chassis regulating system.

To generate the control quantity $a_y^*$, three sensor signals $a_y$, $\delta$ and v are used as input quantities. The first sensor signal $a_y$ is representative of the transverse acceleration of the vehicle, the second sensor signal $\delta$ is representative of the steering lock angle and the third sensor signal v is representative of the speed of the vehicle. Firstly, the first sensor signal $a_y$ runs through a low-pass filter 22 and the second sensor signal $\delta$ runs through a high-pass filter 24; the resulting signals are designated hereinbelow as $a_{y1}$ and $\delta_h$, respectively. A weighting factor K (transition weight) is allocated to the amplitude of the low-pass filtered first sensor signal $a_{y1}$ in accordance with a given function or table. The high-pass filtered second sensor signal $\delta_h$ and also the third sensor signal v are passed to a vehicle tracking model. The vehicle tracking model functions as transverse acceleration estimation arrangement 14, in order to determine the present driving state from the two input quantities $\delta_h$ and v. The transverse acceleration estimation arrangement 14 provides as output quantity an estimated transverse acceleration $â_y$, which is then multiplied with the weighting factor K. The weighted estimation signal $â_{y,K}$ which is thus obtained and the low-pass filtered first sensor signal $a_{y1}$ are superimposed additively and thus finally produce the control quantity $a_y^*$.

The individual steps of the method described above are carried out in a device 10 which comprises a transverse acceleration sensor 16, a steering angle sensor 18, a speed sensor 20, a low-pass filter 22, a high-pass filter 24, an arrangement 26 for allocating the weighting factor K, a transverse acceleration estimation arrangement 14, an arrangement 28 for multiplication of the estimated transverse acceleration signal $â_y$ with the weighting factor K, an arrangement 30 for the additive superimposing of the weighted estimation signal $â_{yK}$ with the first signal $a_y$ and an actuator 12.

Figure 2:
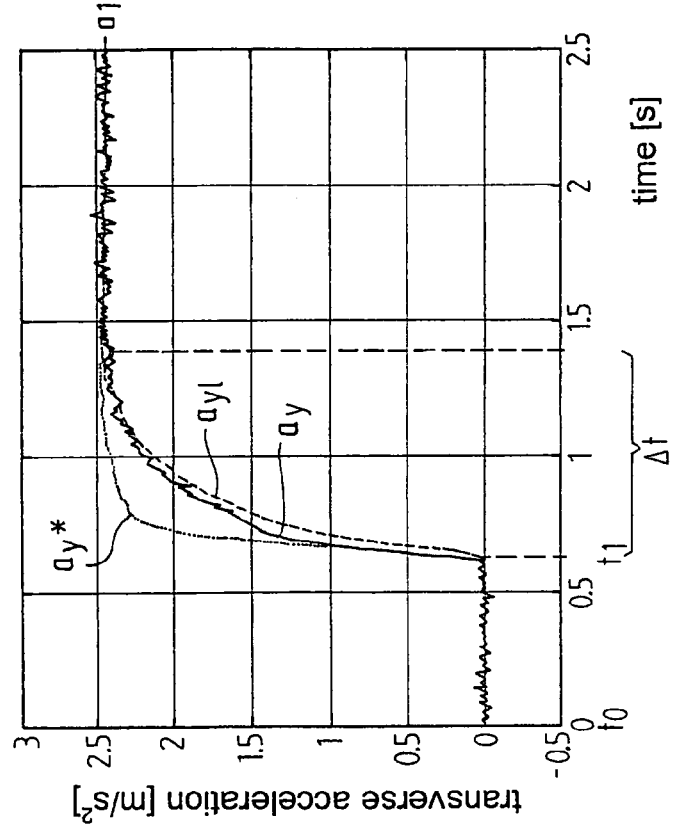
FIG. 2 shows the pattern of various transverse acceleration signals as a function of time.

In the diagram of FIG. 2, the unfiltered first sensor signal $a_y$, the low-pass filtered sensor signal $a_{y1}$ and the control quantity $a_y$*, generated by the method according to the invention, are illustrated as a function of time, in order to illustrate the advantages of the method according to the invention.

The transverse acceleration sensor 16 responds at the instant $t_1$ to a steering angle jump at the instant $t_0=0$ s, with the signal $a_y$, which after a rising time $\Delta t$ assumes a constant value $a_1$. The signal $a_y$ is superimposed by interferences, which are due to oscillations of attachment parts of the transverse acceleration sensor 16 and/or by background noise. In the low-pass filtered signal $a_{y1}$ illustrated by dashed lines, the interferences are largely eliminated, the rise being somewhat delayed compared with the unfiltered sensor signal $a_y$. The control quantity $a_y$* generated according to the invention, like the low-pass filtered sensor signal $a_{y1}$, is largely interference-free, but the signal pattern has in addition a substantially steeper rise. Through the increase of the signal in the rise region, the rising time is distinctly reduced, so that a shortening of the response time of the actuators of the chassis regulating system is achieved.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for operating a chassis regulating system of a vehicle, in which a control quantity is generated for an actuator, the method comprising the following steps:
    providing a first signal, which is representative of a transverse acceleration of the vehicle,
    providing a second signal, which is representative of a steering lock angle,
    providing a third signal, which is representative of a speed of the vehicle,
    allocating a weighting factor for an amplitude of the first signal,
    generating an estimated transverse acceleration signal from the second signal and the third signal,
    generating a weighted estimation signal by multiplying the estimated transverse acceleration signal with a weighting factor, and
    generating the control quantity by additive superimposing of the weighted estimation signal with the first signal.

2. The method according to claim 1, characterized in that the first signal is low-pass filtered before the allocating of the weighting factor and before the additive superimposing with the weighted estimation signal.

3. The method according to claim 1, characterized in that the second signal is high-pass filtered before the generating of the estimated transverse acceleration signal.

4. The method according to claim 1, characterized in that the allocating of the weighting factor is carried out in accordance with a given function or table.

5. A device for carrying out the method according to claim 1, characterized in that the device comprises an arrangement for allocating the weighting factor, a transverse acceleration estimation arrangement for generating the estimated transverse acceleration signal, an arrangement for the multiplication of the estimated transverse acceleration signal with the weighting factor and an arrangement for the additive superimposing of the weighted estimation signal with the first signal.

6. The device according to claim 5, characterized in that the device comprises a low-pass filter for low-pass filtering of the first signal.

7. The device according to claim 5, characterized in that the device comprises a high-pass filter for high-pass filtering of the second signal.

8. The device according to claim 5, characterized in that the device comprises a transverse acceleration sensor to provide the first signal.

9. The device according to claim 5, characterized in that the device comprises a steering angle sensor to provide the second signal.

10. The device according to claim 5, characterized in that the device comprises a speed sensor to provide the third signal.

11. A device for operating a chassis regulating system of a vehicle, in which a control quantity is generated for an actuator according to a method comprising the following steps:
    providing a first signal, which is representative of a transverse acceleration of the vehicle,
    providing a second signal, which is representative of a steering lock angle,
    providing a third signal, which is representative of a speed of the vehicle,
    allocating a weighting factor for an amplitude of the first signal,
    generating an estimated transverse acceleration signal from the second signal and the third signal,
    generating a weighted estimation signal by multiplying the estimated transverse acceleration signal with the weighting factor, and
    generating the control quantity by additive superimposing of the weighted estimation signal with the first signal,
the device comprising;
    an arrangement for allocating the weighting factor;
    a transverse acceleration estimation arrangement for generating the estimated transverse acceleration signal;
    an arrangement for the multiplication of the estimated transverse acceleration signal with the weighting factor; and
    an arrangement for the additive superimposing of the weighted estimation signal with the first signal.

12. The device according to claim 11, characterized in that the device further comprises a low-pass filter for low-pass filtering of the first signal.

13. The device according to claim 11, characterized in that the device comprises a high-pass filter for high-pass filtering of the second signal.

14. The device according to claim 11, characterized in that the device comprises a transverse acceleration sensor to provide the first signal.

15. The device according to claim 11, characterized in that the device comprises a steering angle sensor to provide the second signal.

16. The device according to claim 11, characterized in that the device comprises a speed sensor to provide the third signal.

* * * * *